US008984271B2

(12) United States Patent
Marlow et al.

(10) Patent No.: US 8,984,271 B2
(45) Date of Patent: Mar. 17, 2015

(54) USER INTERFACE SYSTEMS AND METHODS FOR INPUT AND DISPLAY OF SECURE AND INSECURE MESSAGE ORIENTED COMMUNICATIONS

(75) Inventors: William J. Marlow, Herndon, VA (US); Robert Cichielo, Asbury, NJ (US); Emil Sturniolo, Medina, OH (US); Paul Benware, Mendon, NY (US)

(73) Assignee: Protected Mobility, LLC, Rockville, MD (US)

( * ) Notice: Subject to any disclaimer, the term of this patent is extended or adjusted under 35 U.S.C. 154(b) by 0 days.

(21) Appl. No.: 13/328,706

(22) Filed: Dec. 16, 2011

(65) Prior Publication Data

US 2012/0159323 A1    Jun. 21, 2012

Related U.S. Application Data

(63) Continuation of application No. 12/940,213, filed on Nov. 5, 2010.

(60) Provisional application No. 61/351,979, filed on Jun. 7, 2010.

(51) Int. Cl.
*H04L 29/06* (2006.01)
*G06F 3/01* (2006.01)
(Continued)

(52) U.S. Cl.
CPC .. *G06F 3/01* (2013.01); *G06F 3/16* (2013.01); *G06F 15/16* (2013.01); *G06F 3/048* (2013.01)
USPC ......... 713/150; 455/410; 455/411; 455/412.1

(58) Field of Classification Search
CPC .......... G06F 3/16; G06F 3/048; H04L 9/0618
USPC ....................................................... 713/150
See application file for complete search history.

(56) References Cited

U.S. PATENT DOCUMENTS 5,592,555 A    1/1997  Stewart
6,125,281 A *  9/2000  Wells et al. ................... 455/466
(Continued)

FOREIGN PATENT DOCUMENTS

WO    WO 0195558 A1 * 12/2001

OTHER PUBLICATIONS

Lisonek et al., SMS Encryption for Mobile Communication, Dec. 2008, International Conference on Security Technology, 2008, SECTECH '08, pp. 198-201.*

(Continued)

*Primary Examiner* — Taghi Arani
*Assistant Examiner* — Kenneth Chang
(74) *Attorney, Agent, or Firm* — Nixon & Vanderhye P.C.

(57) ABSTRACT

Given the rise in popularity of communicating personal, private, sensitive, or vital peer-to-peer or peer-to-group information over potentially insecure text messaging infrastructure, it would be highly desirable to provide a solution that would enable the initiator and/or the consumer of these communiqués to determine the state of the privacy associated with the messages. The non-limiting technology herein provides systems and methods for enabling a consumer to graphically, linguistically, verbally, or programmatically, determine the privacy and security state of a communiqué and/or the privacy/security association with the at least one plurality of peers. Methods and systems provided by a computer application can enable a consumer to input message oriented data that will be subsequently communicated to at least one of a plurality of peers. Upon reception of the data, systems and methods are also describe to display the message oriented communiqué to the at least one peer consumer or other user.

13 Claims, 30 Drawing Sheets

(51) Int. Cl.
*G06F 3/16* (2006.01)
*G06F 15/16* (2006.01)
*G06F 3/048* (2013.01)

(56) References Cited

U.S. PATENT DOCUMENTS

| | | | |
|---|---|---|---|
| 6,356,937 B1 * | 3/2002 | Montville et al. | 709/206 |
| 7,076,657 B2 | 7/2006 | Koukoulidis et al. | |
| 7,424,615 B1 | 9/2008 | Jalbert et al. | |
| 7,702,898 B2 | 4/2010 | Tan | |
| 8,064,606 B2 | 11/2011 | Schuba et al. | |
| 8,386,800 B2 | 2/2013 | Kocher et al. | |
| 8,464,061 B2 | 6/2013 | Bradley | |
| 2002/0123967 A1 * | 9/2002 | Wang | 705/51 |
| 2003/0078058 A1 * | 4/2003 | Vatanen et al. | 455/466 |
| 2004/0171369 A1 | 9/2004 | Little et al. | |
| 2005/0081054 A1 * | 4/2005 | Choo | 713/200 |
| 2005/0232422 A1 * | 10/2005 | Lin et al. | 380/255 |
| 2006/0158460 A1 * | 7/2006 | Uh | 345/619 |
| 2006/0246956 A1 * | 11/2006 | Park et al. | 455/566 |
| 2007/0022295 A1 * | 1/2007 | Little et al. | 713/176 |
| 2007/0072564 A1 * | 3/2007 | Adams | 455/115.1 |
| 2007/0083766 A1 | 4/2007 | Farnham et al. | |
| 2007/0185815 A1 | 8/2007 | Boccon-Gibod et al. | |
| 2008/0313458 A1 | 12/2008 | Fascenda et al. | |
| 2009/0055643 A1 * | 2/2009 | Brown et al. | 713/160 |
| 2009/0169013 A1 | 7/2009 | Fascenda et al. | |
| 2009/0185677 A1 | 7/2009 | Bugbee | |
| 2009/0228707 A1 | 9/2009 | Linsky | |
| 2009/0265552 A1 | 10/2009 | Moshir et al. | |
| 2009/0268902 A1 | 10/2009 | Fascenda et al. | |
| 2010/0020972 A1 | 1/2010 | Baugher et al. | |
| 2010/0159962 A1 * | 6/2010 | Cai et al. | 455/466 |
| 2011/0138170 A1 | 6/2011 | Fascenda et al. | |
| 2011/0138172 A1 | 6/2011 | McCreight et al. | |
| 2011/0194695 A1 | 8/2011 | Fascenda et al. | |
| 2012/0054493 A1 | 3/2012 | Bradley | |
| 2012/0239417 A1 | 9/2012 | Pourfallah et al. | |
| 2012/0239560 A1 | 9/2012 | Pourfallah et al. | |
| 2013/0030828 A1 | 1/2013 | Pourfallah et al. | |

OTHER PUBLICATIONS

Office Action dated Oct. 4, 2013, issued in related U.S. Appl. No. 12/940,213.
May 23, 2014 Office Action in U.S. Appl. No. 13/670,994.
Nov. 15, 2013 & Apr. 30, 2014 Office Actions in U.S. Appl. No. 13/670,925.
Aug. 16, 2012 & Oct. 4, 2013 Office Actions in U.S. Appl. No. 12/940,213.
Feb. 25, 2014 Office Action in U.S. Appl. No. 13/671,054.

\* cited by examiner

USER INTERFACE SYSTEMS AND METHODS FOR INPUT AND DISPLAY OF SECURE AND INSECURE MESSAGE ORIENTED COMMUNICATIONS

CROSS-REFERENCES TO RELATED APPLICATIONS

This application is a continuation-in-part of U.S. patent application Ser. No. 12/940,213 filed Nov. 5, 2010; which claims priority from U.S. Provisional Patent Application No. 61/351,979 filed Jun. 7, 2010. Each of these prior disclosures is incorporated herein by reference.

STATEMENT REGARDING FEDERALLY SPONSORED RESEARCH OR DEVELOPMENT

Field

The technology herein relates to computing system human-machine interfaces, and more particularly to input/output arrangements for the secure and insecure exchange of message oriented and/or command and control data between at least two of a plurality of peer devices. More specifically, the systems and methods relates to how message oriented information may be input and/or displayed to a consumer of that information on at least one of the plurality of devices.

BACKGROUND AND SUMMARY

While a limited number of technologically-savvy users have always been able to use even the most difficult and arcane human-machine interfaces (even those that require highly specialized knowledge of computer programming languages), the average consumer is effectively locked out of technology unless and until a sufficiently user-friendly user interface is developed and implemented. So-called "smart phones" are one type of device that has benefited significantly from attention to user interface design. Unlike the pocket telephones of just a few years ago, modern smart phones have touch screens, inertial sensors, high resolution displays, optical sensors and voice activation capabilities. These input and output capabilities have made it possible to implement a range of user applications providing touch gesture recognition, multi-touch inputs, automatic optical pattern recognition, graphical user interface displays, and other exciting functionality.

While enhanced technical capabilities now provide a wide range of graphical user interfaces, decisions concerning precisely how users should interact with a particular application on a particular device are more complex than ever before. For example, due to the popularity and proliferation of different message oriented communication services available today such as SMS, MMS, Twitter, Facebook, Google messaging, Blackberry Messenger, Skype, etc., consumers are left with a dizzying array of user interfaces (UI) to contend with to manage the information flow. Each different product or application may expose different ways to input and display the message being communicated on the multitude of computer platforms they run on.

This confusion becomes further compounded when concepts of security and/or privacy are added into the mix. Some products like Facebook require a handshake, such as a "friend request", to occur between two cooperating accounts before information is supposed to be shared. Other systems like SMS or MMS allows exchange of messages between devices as long as one party knows the network identity (phone number) of the other. Some computer applications are available that even aggregate these distinct communications streams into a common "Inbox', making It easier for the consumer to potentially navigate the messages. However, in many such common interfaces available today, it may be difficult to tell the difference between messages that were sent or received securely and ones that were not.

Serious challenges are presented when designing a user interface that is to be both easy to use and yet accommodates secrecy. Many of us have seen spy films such as James Bond where a secret agent is issued watches that detonate, cars with adaptive camouflage, mobile phones with fingerprint locks, and the like. Unfortunately, technology mockups for the movies often are not useful or even practical in the real world. Nevertheless, real undercover detectives and other covert operatives have a need for technology that does work and is effective.

Consider for example a situation where an undercover detective or other covert operative needs to be sent a highly strategic message that, if the message falls into the wrong hands, could result in extreme danger to the detective, hostages or innocent bystanders. The last thing the sender may want is to have the detective's smart phone generate a tone or display indicating that a message has arrived. Nevertheless, the detective must be able to access the message covertly, when no one else is looking, with assurance that the message is for his "eyes only".

Given the current complexity among the plethora of different commercially-available implementations, it would be highly desirable to provide a solution that would enable the initiator and/or the consumer of these communiqués to determine the state of privacy associated with each message.

Non-limiting technology herein provides systems and methods for enabling a consumer to graphically, linguistically, verbally, or programmatically, determine the privacy and security state of a communiqué and/or the privacy/security association with the at least one plurality of peers.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Protected Mobility Message Application

Figure 1:
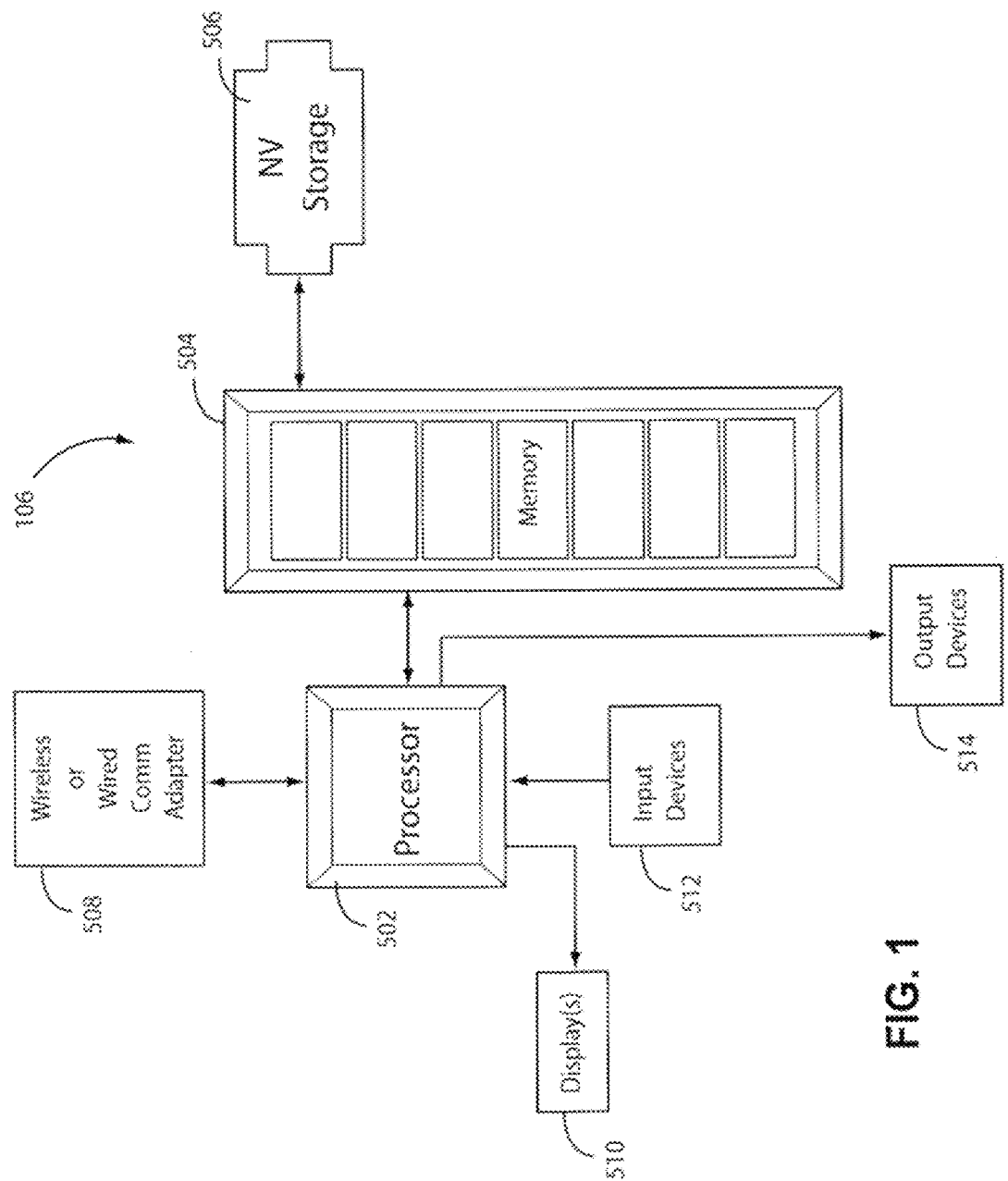
FIG. 1 shows an example non-limiting user device hardware architecture.

FIG. 1 shows an exemplary illustrative non-limiting end-user device 106 including, for example, a processor 502, a memory 504, and non-volatile storage 506. In the example shown, the processor 502 communicates with memory 504, and non-volatile storage 506 may also communicate with the processor either directly or through memory 504. The processor may communicate with the outside world via a wireless or wired communications adapter 508. A user may communicate with device 106 through a user interface provided for example by display or displays 510, input devices 512 and output devices 514. The display or displays 510 may comprise for example liquid crystal displays, plasma displays, rasterized displays, touch screens, or any other variation or other conventional display device. Input devices may include input keys, touch screen keys, pushbuttons, virtual buttons displayed on a touchscreen, a microphone for receiving voice activated commands, accelerometers or other motion detectors, light sensors (with or without pattern recognition capabilities), barcode readers, or any other device capable of conveying information to processor 502. Output devices 514 may include indicator lights, audio speakers, laser outputs, tactile output devices, printers, light projectors, feedback devices or any other output device desirable to provide a humanly perceivable or other output indicia.

In the example shown, the memory 504 may contain a variety of programs and data for manipulation and/or execution by processor 502. Non-volatile, non-transitory storage 506 (which in some exemplary or illustrative implementations may comprise a SIM card, SD card, magnetic disk, optical memory, flash memory, Disk, EPROM, PROM, SSD or any other non-volatile storage device) may supply programs including applications ("apps") to memory 504 for execution by processor 502. Storage or memory is used to maintain the data structures, messages and applications, and the processor executes the application from memory. For example, memory 504 in conjunction with non-volatile storage 506 may store data structures that link user identification information (e.g., telephone number, IP address, email address, name, other unique or non-unique identifier) with associated public keys. Any number of such records 602 may be stored in non-volatile storage 506 and/or memory 504. Different public keys can be associated with different applications if desired, so that for example one public key could be used to communicate with Alice securely via texting, while a different public key could be used for communicating with her via her IP address, etc. Additional data structures stored in the memory may comprise a key ring (e.g., in disk/memory/secure storage) that includes one or a plurality of key ring elements, each comprising for example Contact, Public Key, Key Continuity Value, Other).

Figure 1A:
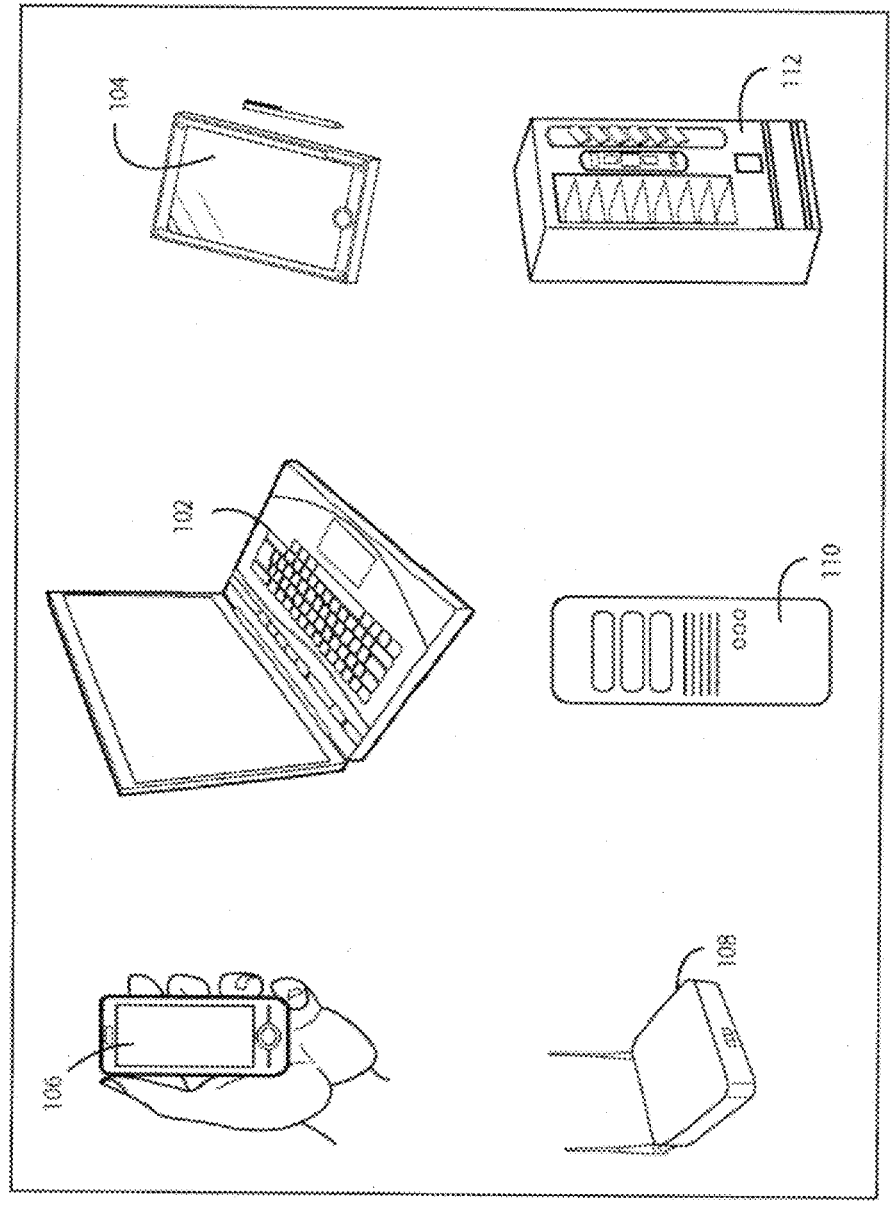
FIG. 1A shows example non-limiting user device form factors.

The form factor of device 106 can be any of a variety of different shapes and sizes such as shown in FIG. 1A, including for example wireless or wired laptop computers 102, tablet computers 104, personal digital assistants or cell phones 106, routers 108, or virtually any other kind of device. Other examples include home entertainment and related components such as smart televisions, enhanced entertainment/infotainment systems or the like that provide messaging applications that display messages on one or more than one displays. Any devices may have a need to communicate messages with any other device. Different user interface arrangements can be used for each of the different form factors of devices 106 as desired.

Non-limiting illustrative implementations may provide certain user interface features across a wide variety of device form factors, operating systems, functionalities, hardware capabilities and particular applications, that enable user manipulation and use of both secure and insecure messaging capabilities. For example, one desirable feature is the ability of a user to easily detect whether a particular message was sent securely or insecurely as well as control whether a message is to be sent securely or insecurely. Another potentially useful non-limiting feature is allowing the device to authenticate user identity before permitting the user to access secure messages and other information. Further non-limiting useful functionality allows selection of notification features (e.g., to keep receipt of a new secure message secret from onlookers). A further useful non-limiting feature enables seamless integration of the secure messaging user interface with typical insecure message handling capabilities that may already be present on a particular device.

Example Apple iPad Device Implementation

Figure 1B:
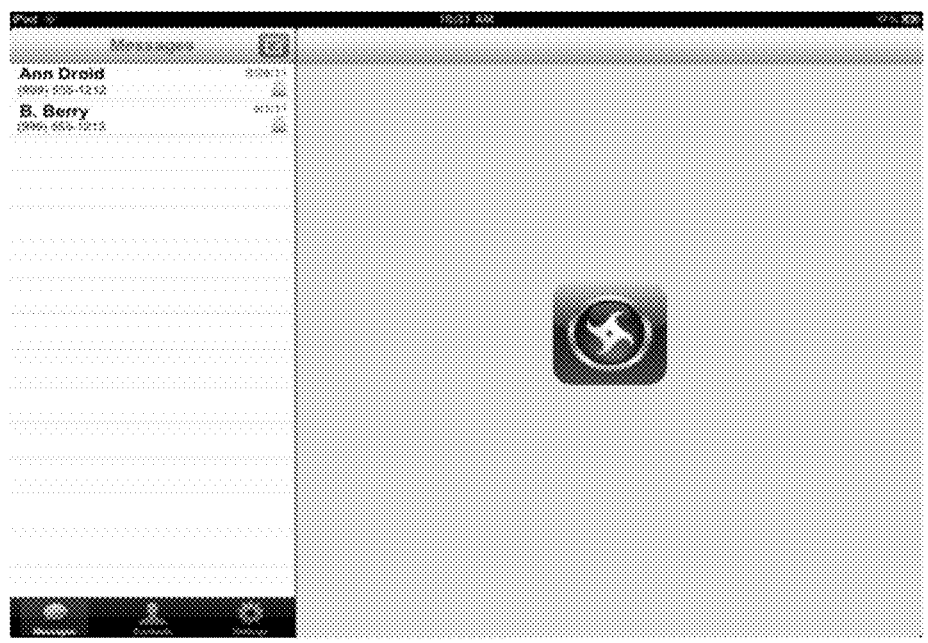
FIG. 1B is a non-limiting illustrative example of a list of secure/unsecure conversations as presented on an Apple Corporation iPad device.
Figure 2:
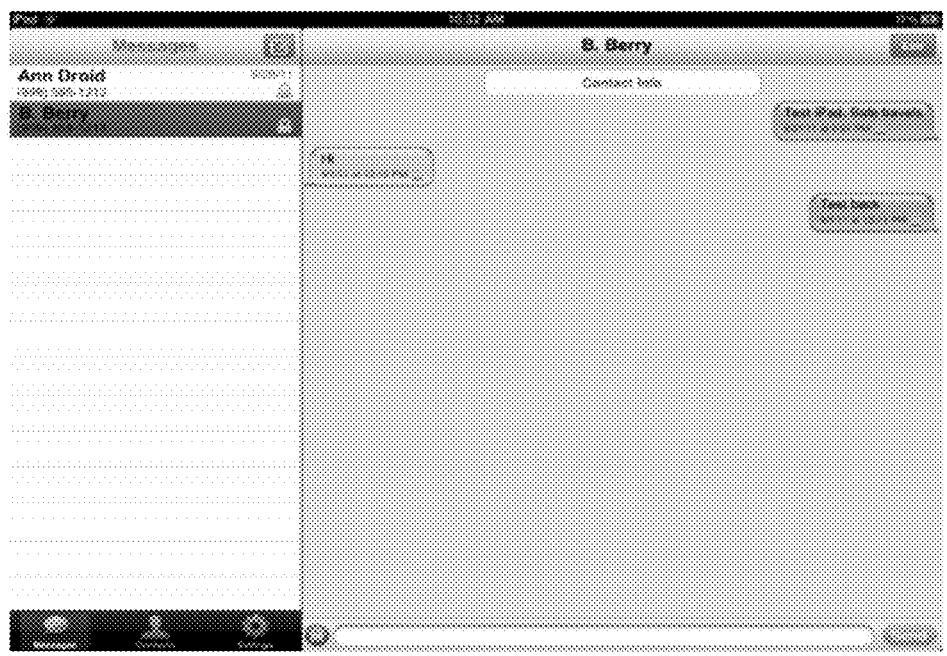
FIG. 2 is a non-limiting illustrative example of a secure message exchange between at least two of a plurality of peers as presented on an Apple Corporation iPad device.
Figure 3:
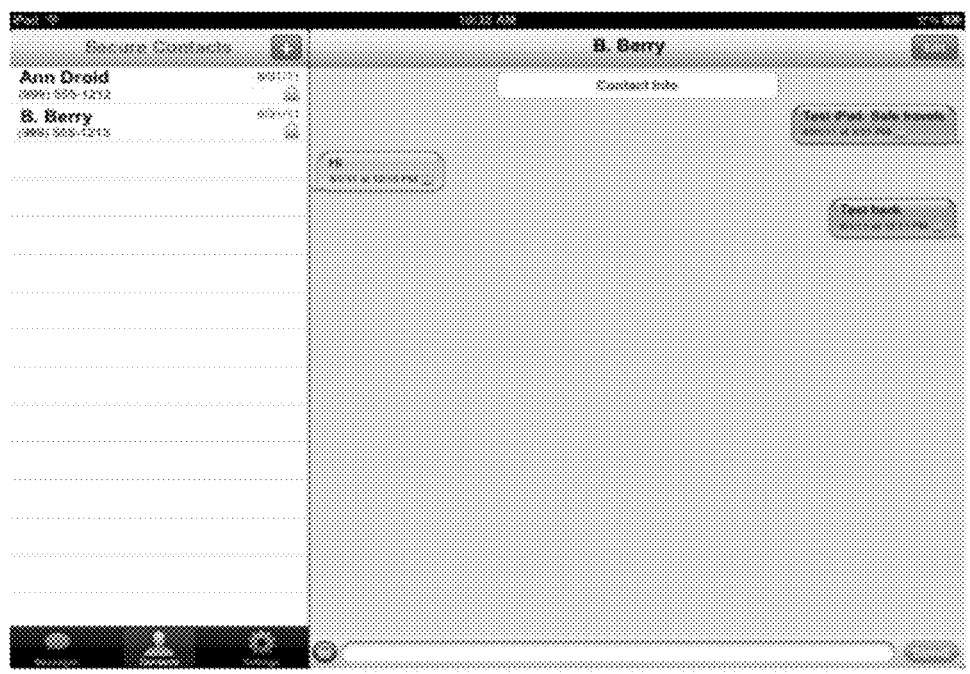
FIG. 3 is a non-limiting illustrative example of a secure contact list as presented on an Apple Corporation iPad device.
Figure 4:
FIG. 4 is a non-limiting illustrative example of an input screen for a password to limit access to a messaging application as presented on an Apple Corporation iPad device.
Figure 5:
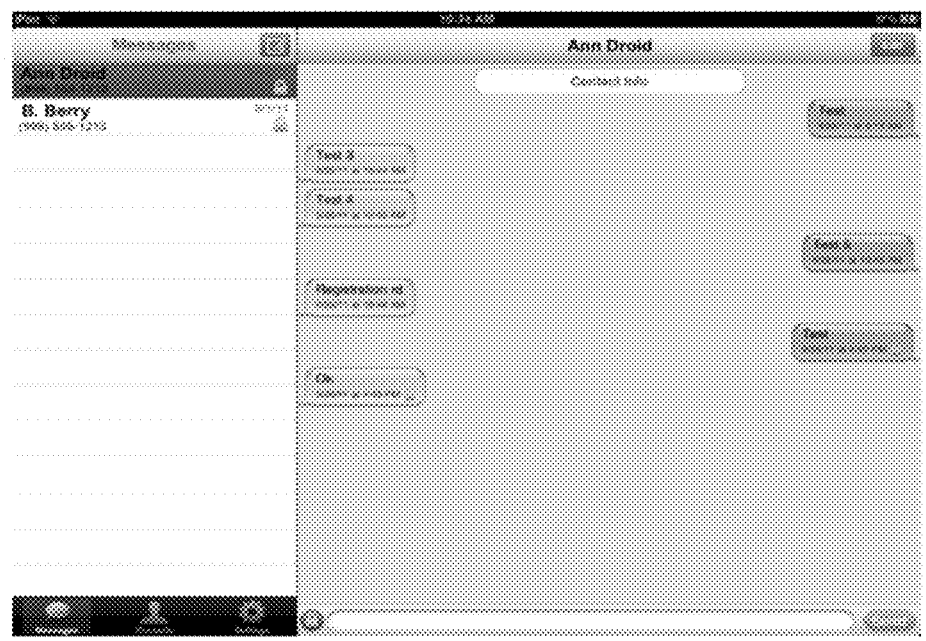
FIG. 5 is a non-limiting illustrative example of a message exchange between at least two of a plurality of peers that includes secure and unsecure messages as presented on an Apple Corporation iPad device.
Figure 6:
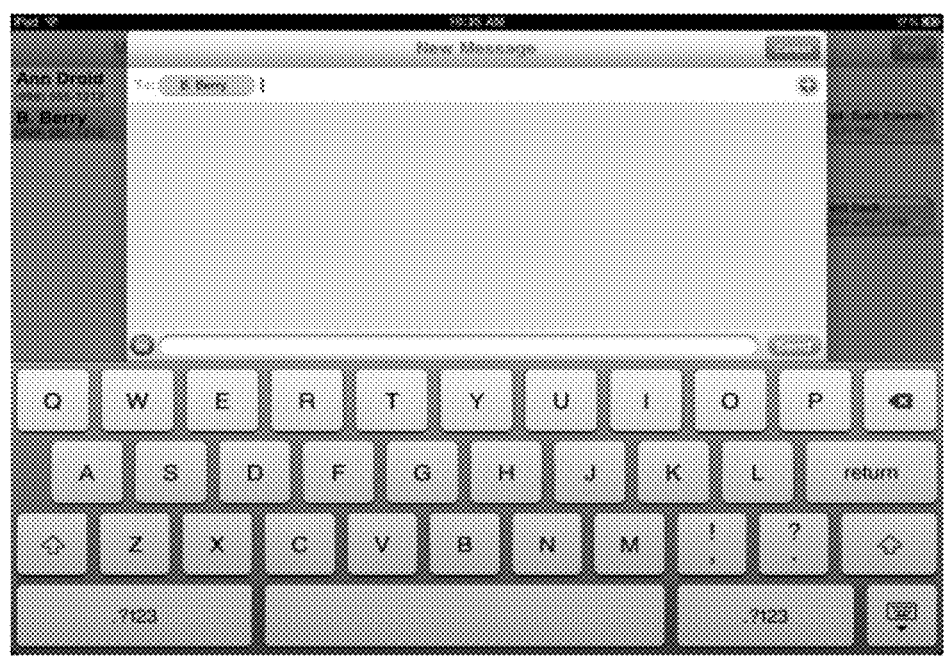
FIG. 6 is a non-limiting illustrative example of an input screen allowing a consumer to enter in a new secure communiqué as presented on an Apple Corporation iPad device.
Figure 7:
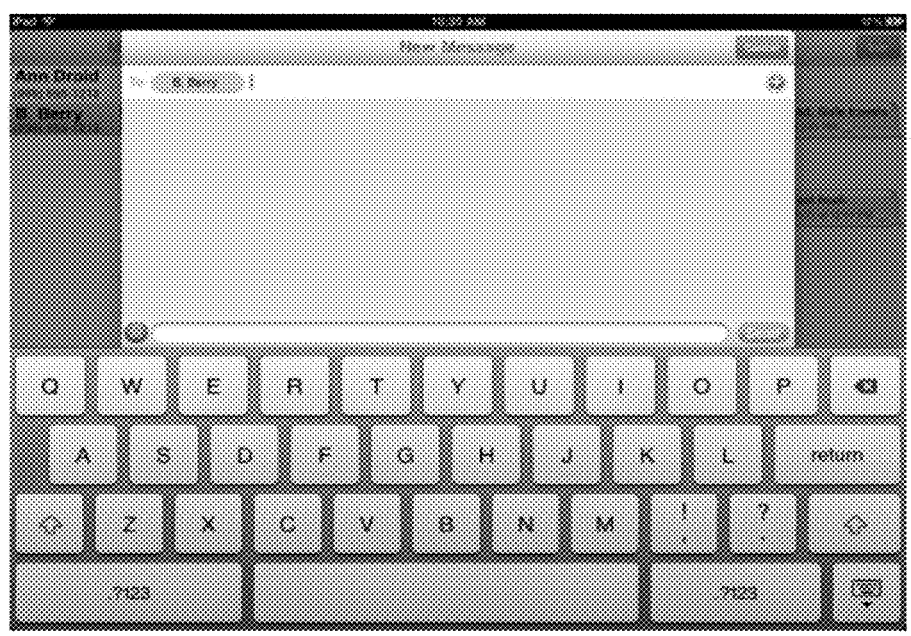
FIG. 7 is a non-limiting illustrative example of an input screen allowing a consumer to enter in a new unsecure communiqué as presented on an Apple Corporation iPad device.
Figure 8:
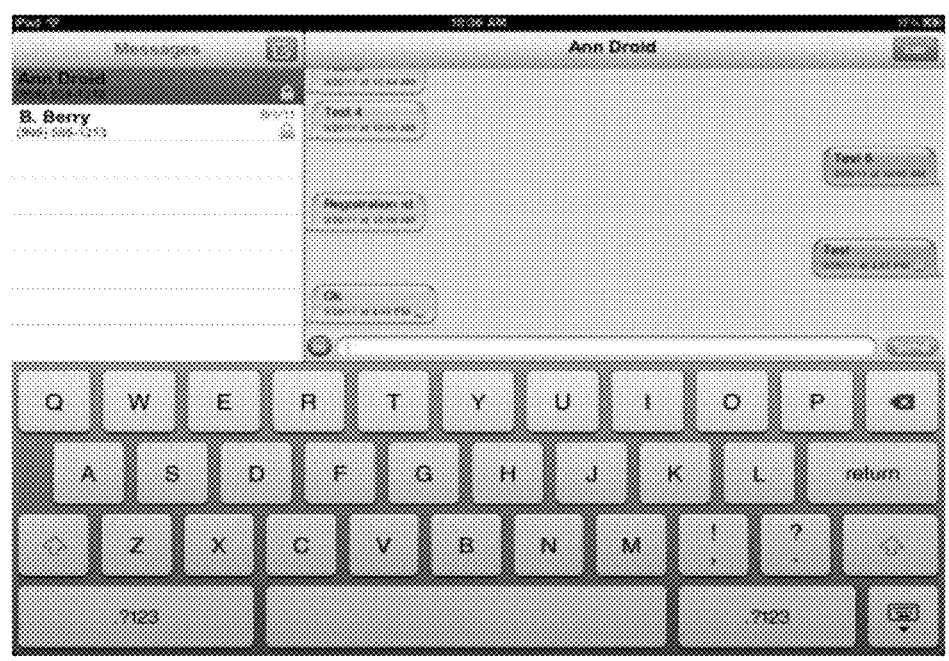
FIG. 8 is alternate non-limiting illustrative example of an input screen allowing a consumer to enter in a new secure communiqué as presented on an Apple Corporation iPad device.
Figure 9:
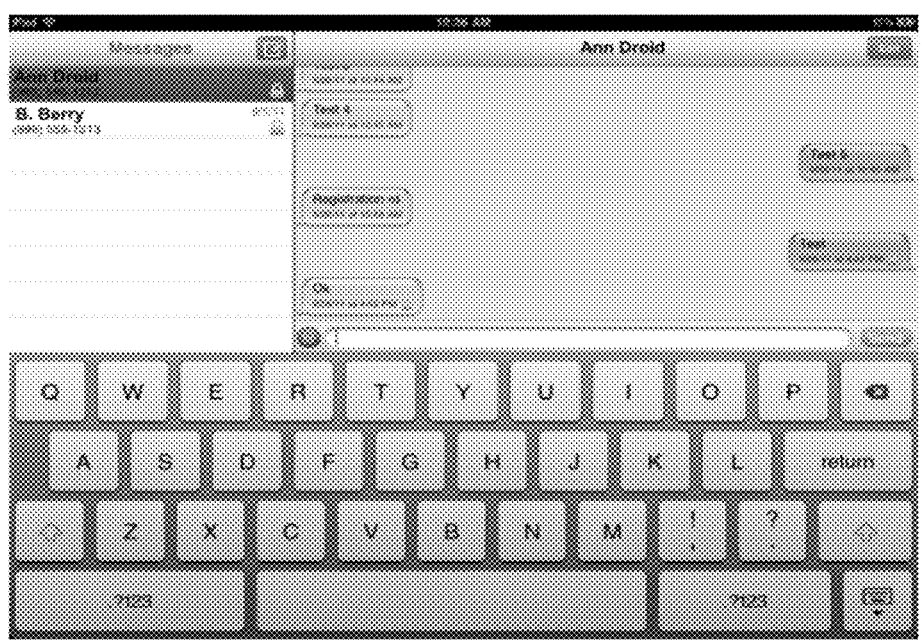
FIG. 9 is alternate non-limiting illustrative example of an input screen allowing a consumer to enter in a new unsecure communiqué as presented on an Apple Corporation iPad device.

For example, FIG. 1B is a non-limiting illustrative example of a list of secure/unsecure conversations as presented on an Apple Corporation iPad device, and FIG. 2 is a non-limiting illustrative example of a secure message exchange between at least two of a plurality of peers as presented on an Apple Corporation iPad device. FIG. 3 is a non-limiting illustrative example of a secure contact list as presented on an Apple Corporation iPad device, and FIG. 4 is a non-limiting illustrative example of an input screen for a password to limit access to a messaging application as presented on an Apple Corporation iPad device. FIG. 5 is a non-limiting illustrative example of a message exchange between at least two of a plurality of peers that includes secure and unsecure messages as presented on an Apple Corporation iPad device, and FIG. 6 is a non-limiting illustrative example of an input screen allowing a consumer to enter in a new secure communiqué as presented on an Apple Corporation iPad device. FIG. 7 is a non-limiting illustrative example of an input screen allowing a consumer to enter in a new unsecure communiqué as presented on an Apple Corporation iPad device, and FIG. 8 is alternate non-limiting illustrative example of an input screen allowing a consumer to enter in a new secure communiqué as presented on an Apple Corporation iPad device. FIG. 9 is alternate non-limiting illustrative example of an input screen allowing a consumer to enter in a new unsecure communiqué as presented on an Apple Corporation iPad device.

Example Apple iPhone Implementation

Figure 10:
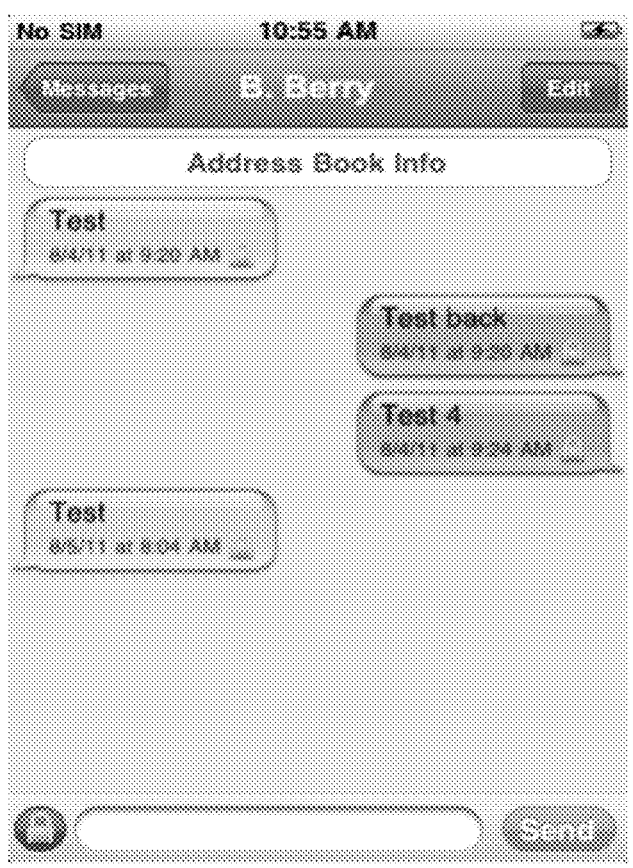
FIG. 10 is non-limiting illustrative example of a secure message exchange between at least two of a plurality of peers as presented on an Apple Corporation iPhone device.
Figure 11:
FIG. 11 is a non-limiting illustrative example of an input screen allowing a consumer to enter in a new unsecure communiqué as presented on an Apple Corporation iPhone device.
Figure 12:
FIG. 12 is a non-limiting illustrative example of an input screen allowing a consumer to enter in a new secure communiqué as presented on an Apple Corporation iPhone device.
Figure 13:
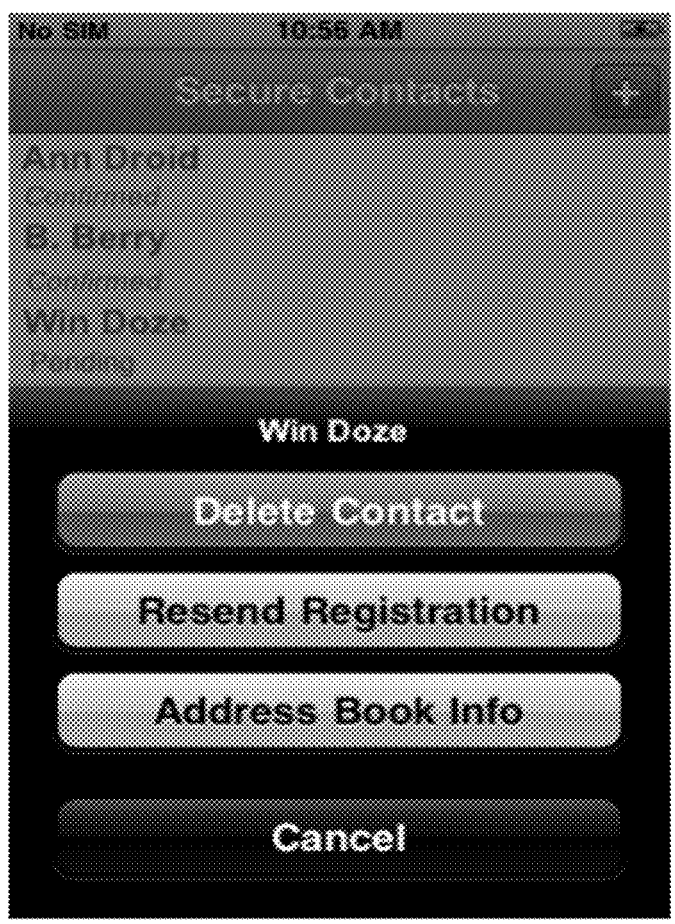
FIG. 13 is a non-limiting illustrative example of an input screen allowing a consumer to delete a secure contact, reestablish an association of a secure contact, or add/view the secure contacts details (email address, phone number, etc) as presented on an Apple Corporation iPhone device.
Figure 14:
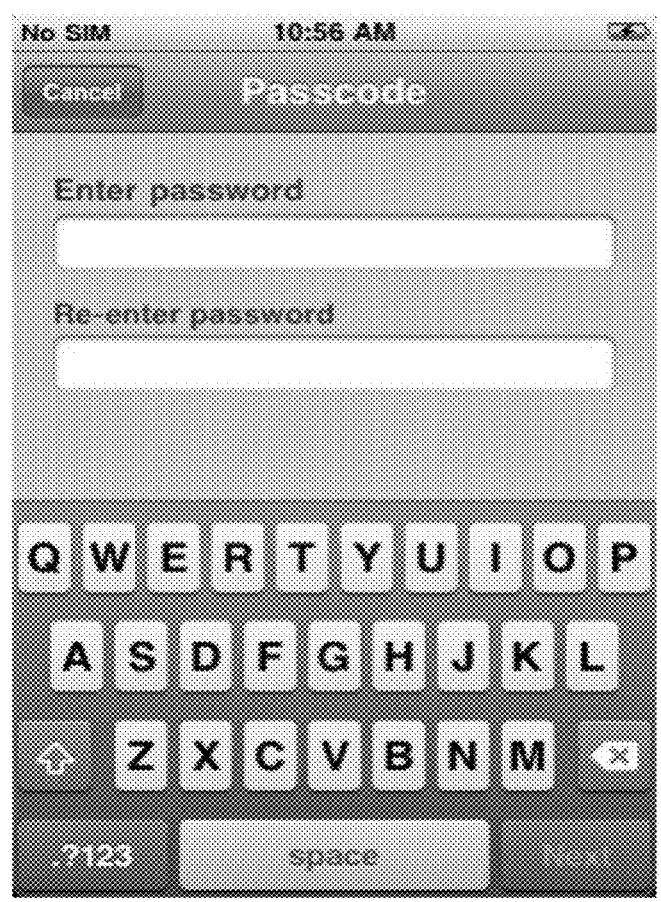
FIG. 14 is a non-limiting illustrative example of an input screen allowing a consumer to input a passcode used to validate and/or secure a contact registration exchange with at least one of a plurality of peers as presented on an Apple Corporation iPhone device.
Figure 15:
FIG. 15 is a non-limiting illustrative example of an input/display screen allowing a consumer review and/or change account information for a message orient service, or input/modify local configuration options as presented on an Apple Corporation iPhone device.

FIG. 10 is non-limiting illustrative example of a secure message exchange between at least two of a plurality of peers as presented on an Apple Corporation iPhone device. FIG. 11 is a non-limiting illustrative example of an input screen allowing a consumer to enter in a new unsecure communiqué as presented on an Apple Corporation iPhone device. FIG. 12 is a non-limiting illustrative example of an input screen allowing a consumer to enter in a new secure communiqué as presented on an Apple Corporation iPhone device. FIG. 13 is a non-limiting illustrative example of an input screen allowing a consumer to delete a secure contact, reestablish an association of a secure contact, or add/view the secure contacts details (email address, phone number, etc) as presented on an Apple Corporation iPhone device. FIG. 14 is a non-limiting illustrative example of an input screen allowing a consumer to input a passcode used to validate and/or secure a contact registration exchange with at least one of a plurality of peers as presented on an Apple Corporation iPhone device. FIG. 15 is a non-limiting illustrative example of an input/display screen allowing a consumer review and/or change account information for a message orient service, or input/modify local configuration options as presented on an Apple Corporation iPhone device.

Example Google Android Implementation

Figure 16:
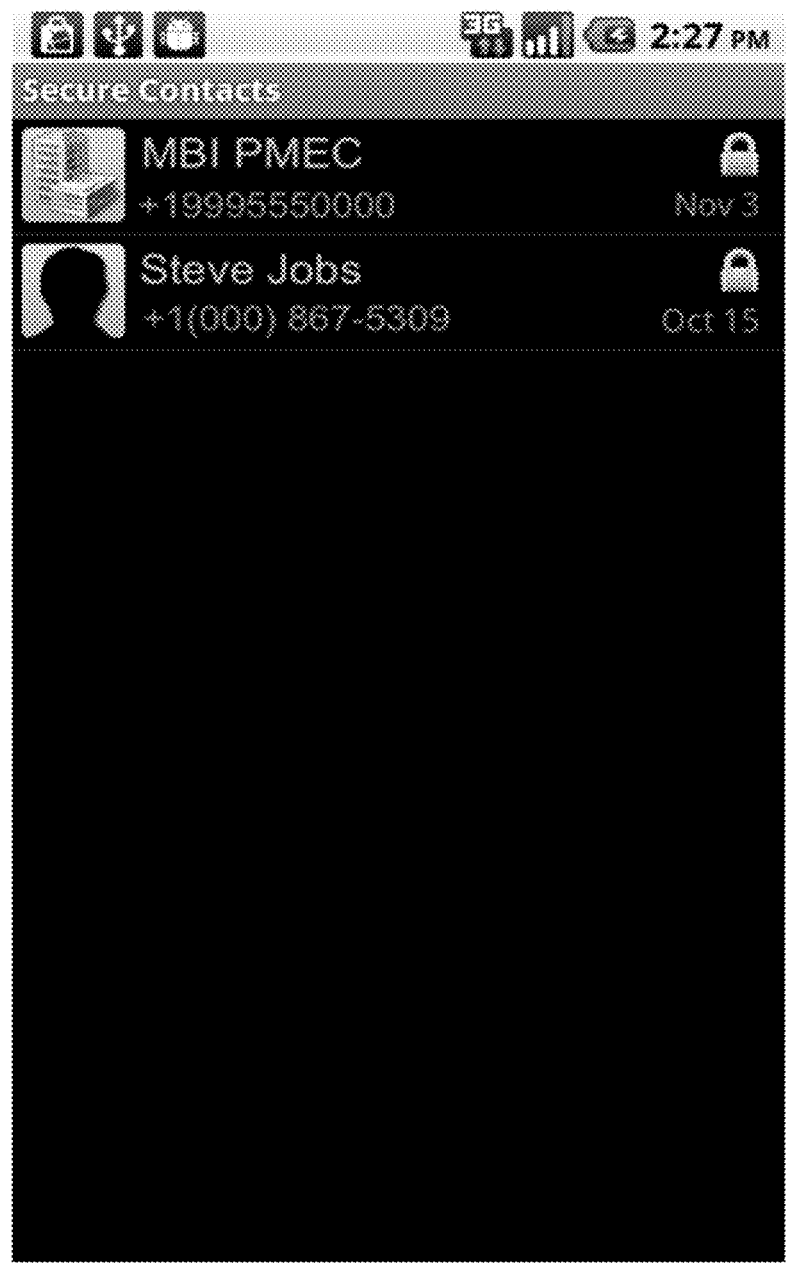
FIG. 16 is a non-limiting illustrative example of a secure contact list as presented on a device running the Google Android operating system.
Figure 17:
FIG. 17 is a non-limiting illustrative example of a secure contact list as presented on a device running the Google Android operating system.
Figure 18:
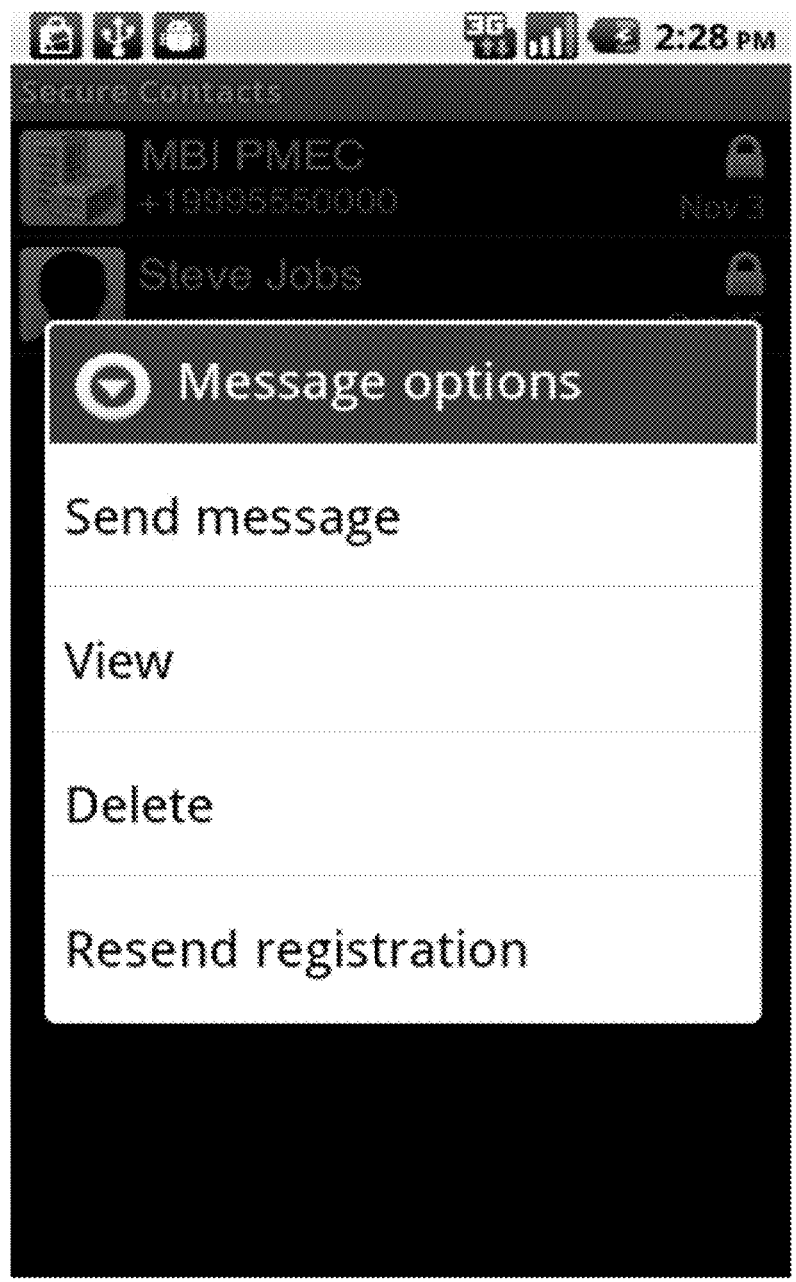
FIG. 18 is a non-limiting illustrative example of an input screen allowing a consumer to delete a secure contact, reestablish an association of a secure contact, or add/view the secure contacts details (email address, phone number, etc) as presented on a device running the Google Android operating system.
Figure 19:
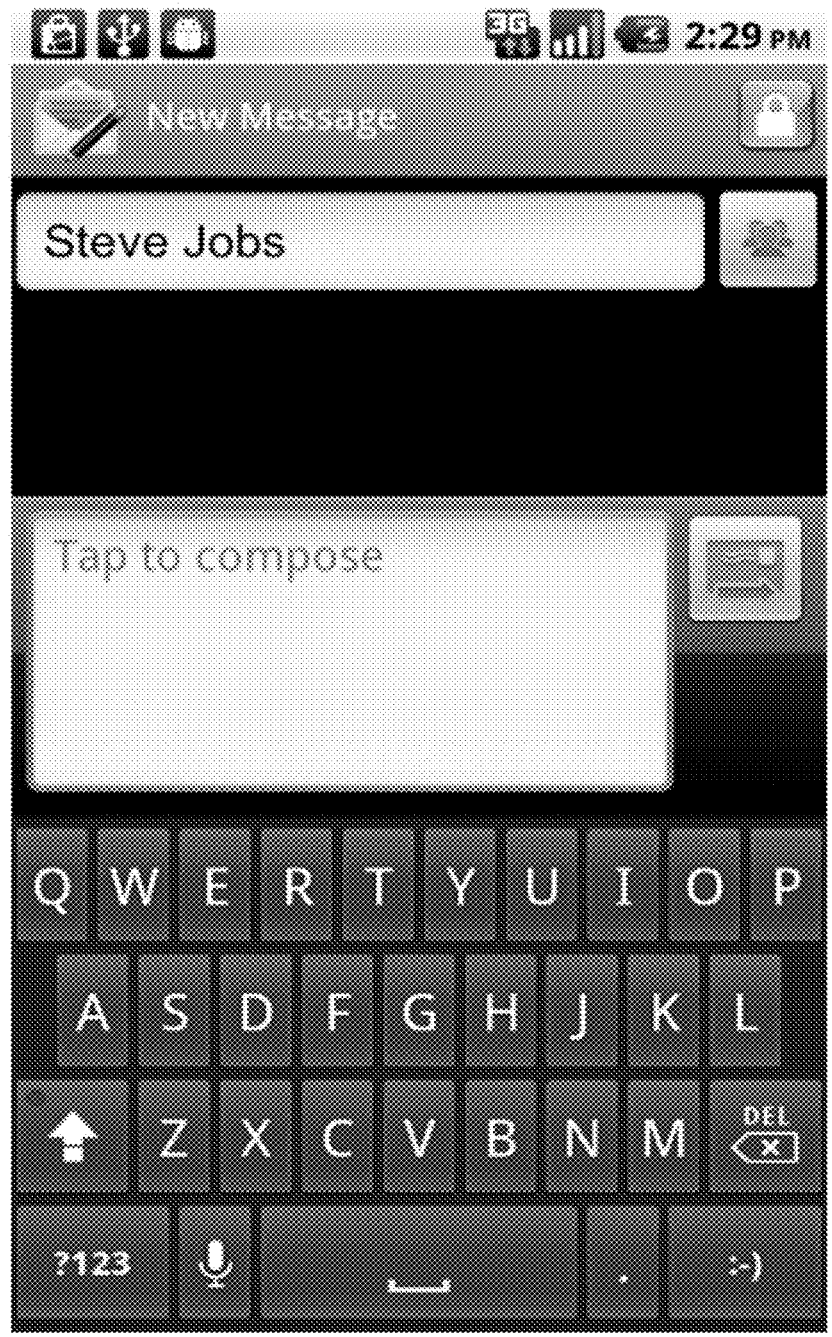
FIG. 19 is a non-limiting illustrative example of an input screen allowing a consumer to enter in a new secure communiqué as presented on a device running the Google Android operating system.
Figure 20:
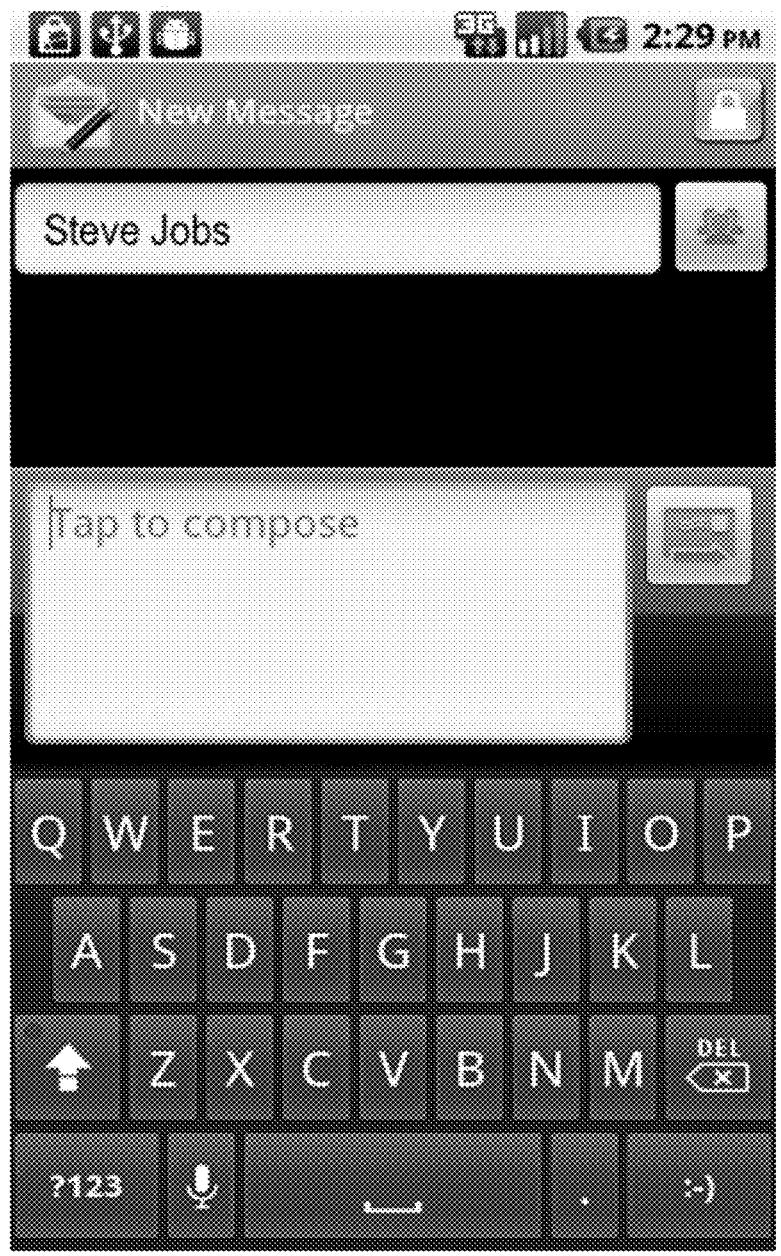
FIG. 20 is a non-limiting illustrative example of an input screen allowing a consumer to enter in a new unsecure communiqué as presented on a device running the Google Android operating system.
Figure 21:
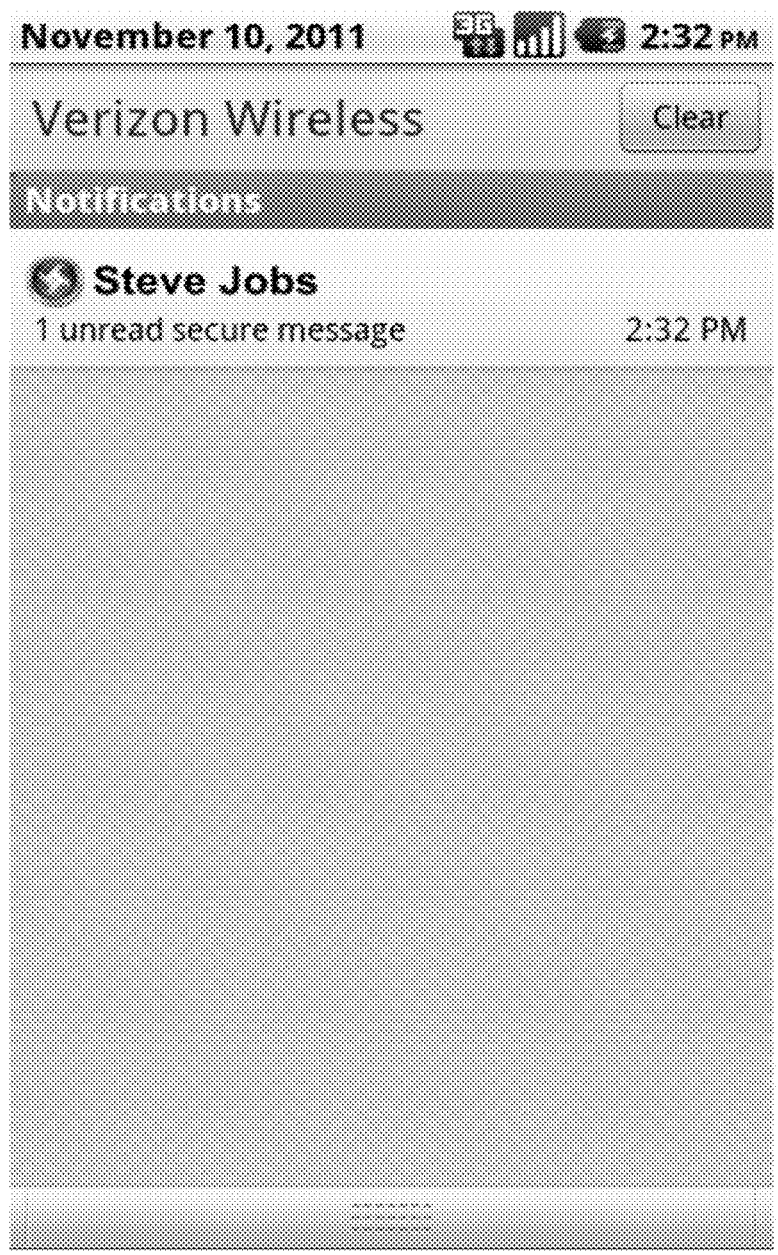
FIG. 21 is a non-limiting illustrative example of a notification screen allowing a consumer to determine that a new communiqué was received as presented on a device running the Google Android operating system.
Figure 22:
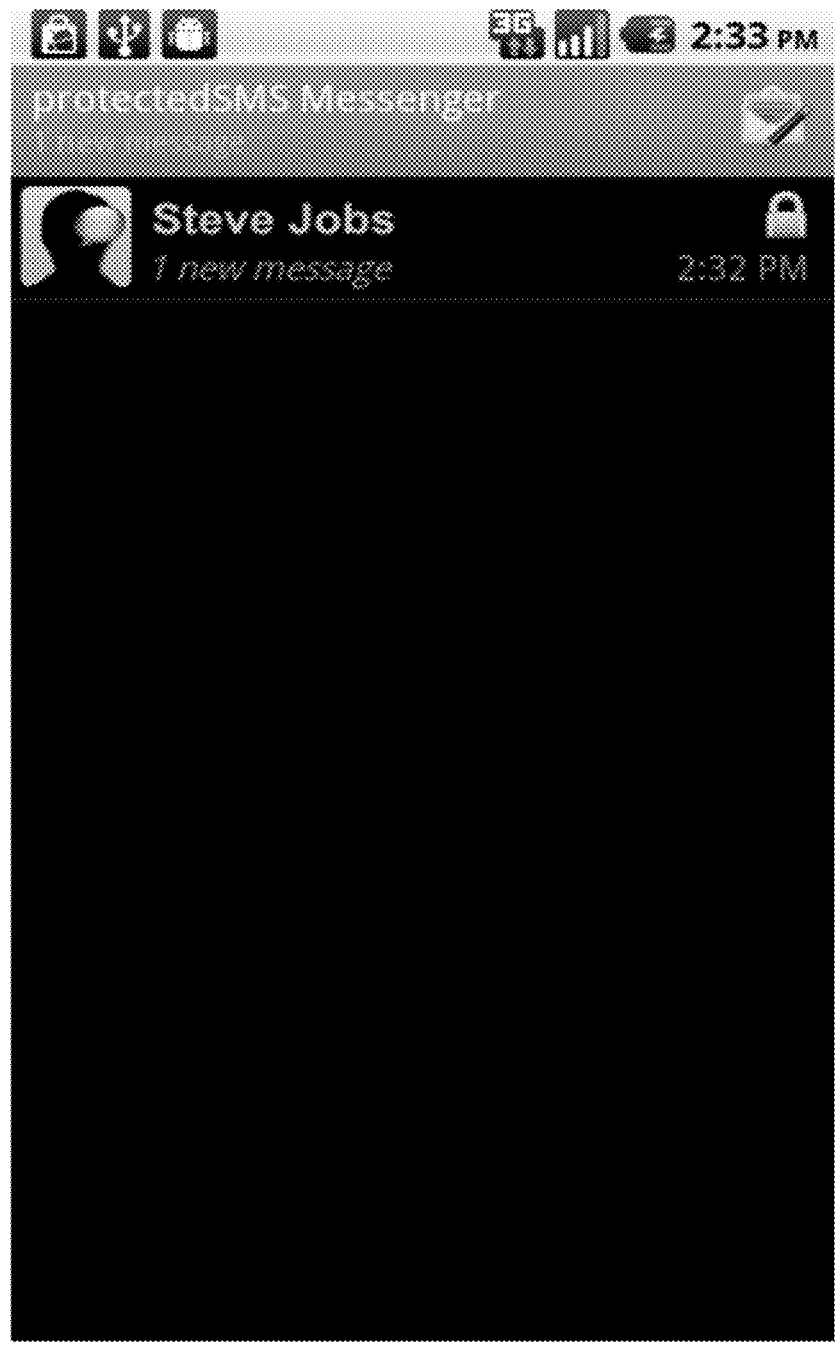
FIG. 22 is a non-limiting illustrative example of a list of secure/unsecure conversations as presented on a device running the Google Android operating system.
Figure 23:
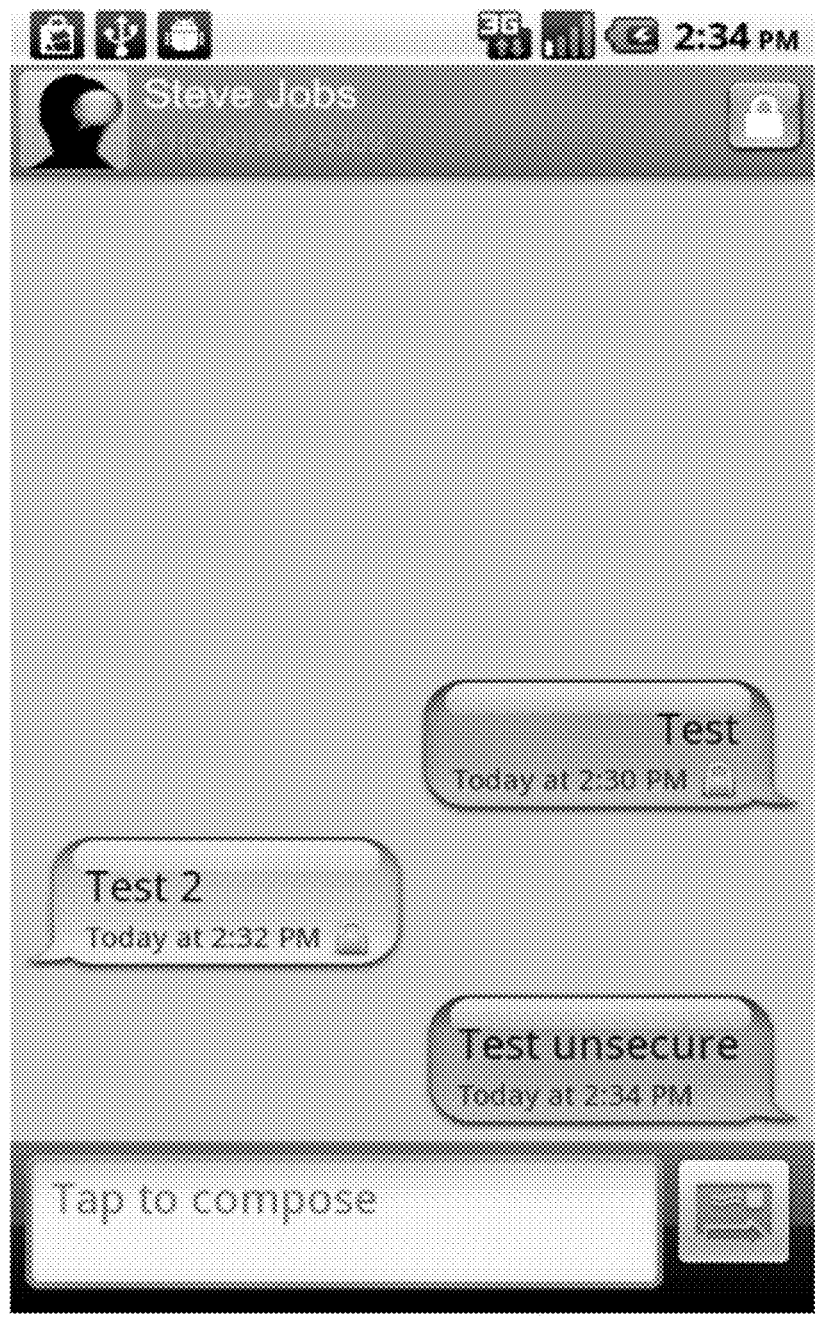
FIG. 23 is a non-limiting illustrative example of an input/display screen allowing a consumer to enter in a new secure/unsecure communiqué as well as review previously received secure/unsecure messages as presented on a device running the Google Android operating system.
Figure 24:
FIG. 24 is a non-limiting illustrative example of an input screen for a password to limit access to a messaging application as presented on a device running the Google Android operating system.

FIG. 16 is a non-limiting illustrative example of a secure contact list as presented on a device running the Google Android operating system. FIG. 17 is a non-limiting illustrative example of a secure contact list as presented on a device running the Google Android operating system. FIG. 18 is a non-limiting illustrative example of an input screen allowing a consumer to delete a secure contact, reestablish an association of a secure contact, or add/view the secure contacts details (email address, phone number, etc.) as presented on a device running the Google Android operating system. FIG. 19 is a non-limiting illustrative example of an input screen allowing a consumer to enter in a new secure communiqué as presented on a device running the Google Android operating system. FIG. 20 is a non-limiting illustrative example of an input screen allowing a consumer to enter in a new unsecure communiqué as presented on a device running the Google Android operating system. FIG. 21 is a non-limiting illustrative example of a notification screen allowing a consumer to determine that a new communiqué was received as presented on a device running the Google Android operating system. FIG. 22 is a non-limiting illustrative example of a list of secure/unsecure conversations as presented on a device running the Google Android operating system. FIG. 23 is a non-limiting illustrative example of an input/display screen allowing a consumer to enter in a new secure/unsecure communiqué as well as review previously received secure/unsecure messages as presented on a device running the Google Android operating system. FIG. 24 is a non-limiting illustrative example of an input screen for a password to limit access to a messaging application as presented on a device running the Google Android operating system.

Example Blackberry Device Implementation

Figure 25:
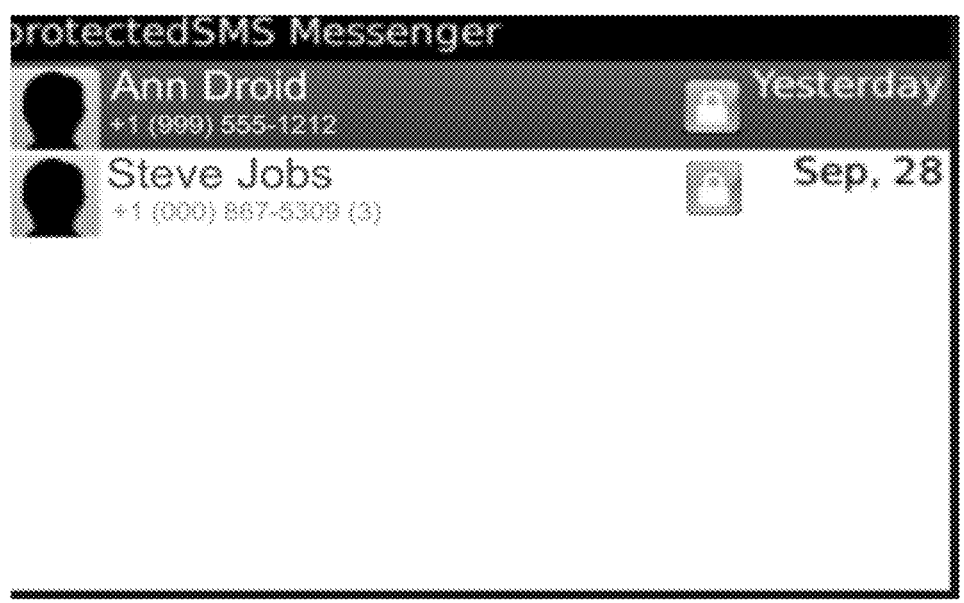
FIG. 25 is a non-limiting illustrative example of a list of secure/unsecure conversations as presented on a Research In Motion Blackberry device.
Figure 26:
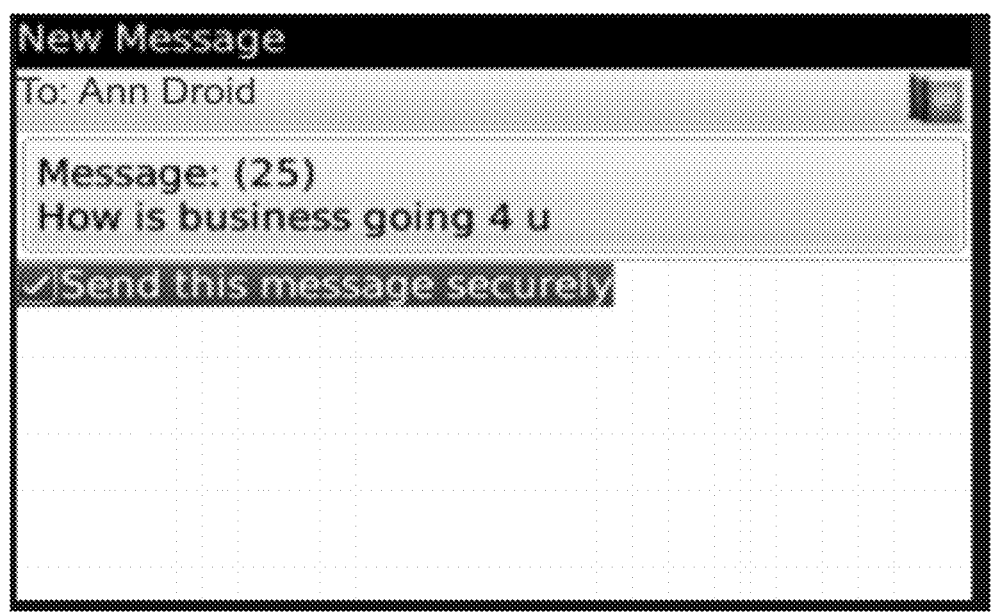
FIG. 26 is a non-limiting illustrative example of an input/display screen allowing a consumer to input a new secure/unsecure communiqué as presented on a Research In Motion Blackberry device.
Figure 27:
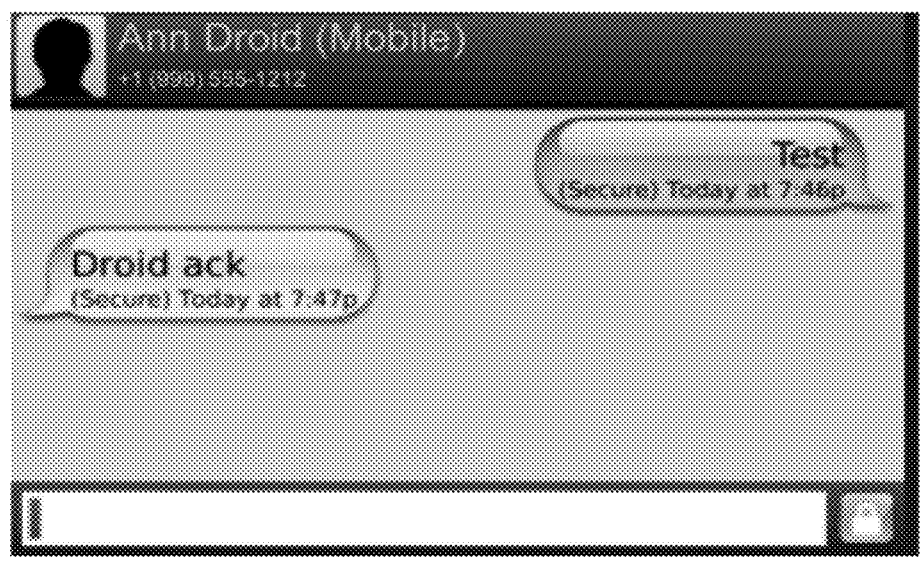
FIG. 27 is a non-limiting illustrative example of an input/display screen allowing a consumer to input a new secure/unsecure communiqué as well as review previously received secure/unsecure messages as presented on a Research In Motion Blackberry device.
Figure 28:
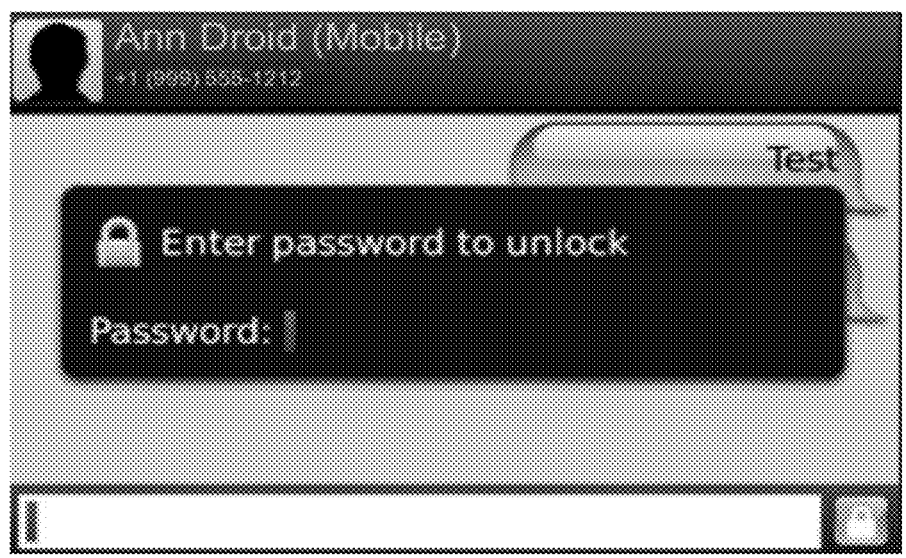
FIG. 28 is a non-limiting illustrative example of an input screen for a password that limits access to a messaging application as presented on a Research In Motion Blackberry device.

FIG. 25 is a non-limiting illustrative example of a list of secure/unsecure conversations as presented on a Research In Motion Blackberry device. FIG. 26 is a non-limiting illustrative example of an input/display screen allowing a consumer to input a new secure/unsecure communiqué as presented on a Research In Motion Blackberry device. FIG. 27 is a non-limiting illustrative example of an input/display screen allowing a consumer to input a new secure/unsecure communiqué as well as review previously received secure/unsecure messages as presented on a Research In Motion Blackberry device. FIG. 28 is a non-limiting illustrative example of an input screen for a password that limits access to a messaging application as presented on a Research In Motion Blackberry device.

Example UI Feature: Secure Messaging Indication

FIG. 1B presents a simple non-limiting example list of conversations presented to a user such as a consumer by a device 106 under software control. To make it easier for a consumer to navigate between different conversations, messages between a given set of at least one of a plurality of peers are coalesced into separate threads. Alternatively, all message can be entered into one long list, making it more difficult for a consumer to follow a specific conversation as information from at least another of a plurality of peers would be intermixed. In this exemplary embodiment, a list of "threaded" conversations are presented to the consumer. However, by including the graphical "lock" icon associated with the conversation list element, a consumer can easily determine that that thread contains secure messages. Other exemplary embodiment can be seen in FIG. 25 and FIG. 22. In such illustrative non-limiting embodiments, not only is the graphical lock icon displayed, but a count is also provided regarding the number of unread or secure messages in the thread.

This state of the security of the messages is not limited to just a graphical iconic display. For example, in a non-limiting additional embodiment, one might render the word "secure" as seen in FIG. 27. In this illustrative example, a consumer has selected to review the messages within a threaded conversation. Along with the date and time, the word "secure" appears to alert the consumer as to how the communiqué was sent or received. Allowing for such information to be presented linguistically or textually enables a certain class of consumers or use cases to understand the security state. More specifically, technology such as text-to-speech or speech-to-text may be used in a hands-free application. Also consider individuals that have visual acuity issues. In these non-limiting scenarios, the state of the security can be generated via a device's audio subsystem. Verbal security state commands may also be given when generating a new message to be sent to at least one of a plurality of peers.

Alternatively, non-limiting embodiments in FIGS. 2 and 10 present security state information using the graphical lock icon to the consumer. This is useful as one can see viewing the illustrative non-limiting examples in FIGS. 5 and 23. In these non-limiting exemplary embodiments, a consumer can easily assess the security of each message in the conversation. In these scenarios, a consumer has exchanged messages with at least one of a plurality of peers. However, each of these messages may have been communicated either securely or insecurely. By presenting the security state with each message, a consumer is able to review the information appropriately. Even if the messages were not separated into threaded conversations, the consumer could easily determine the security status of a message.

Example UI Feature: New Message Security Selection

Generating new communiqués may also make use of security state information to determine how to transmit a message to at least one of a plurality of peers. The illustrative non-limiting embodiments represented in FIGS. 6, 12, and 19 provide the graphical lock icon as a button to enable the consumer to easily change the security attribute of a message being generated. In this scenario, when the button is highlighted, the message is to be communicated to the at least one of a plurality of peers in a secure manner. Alternatively, as presented in the exemplary non-limiting embodiments of FIGS. 7, 11, and 20, when the button is greyed out, the message is to be communicated to the at least one of a plurality of peers in a non-secure or clear text manner.

A similar non-limiting illustrative input method represented in FIGS. 8 and 9 allows for the input of the message along with the security attribute on the same screen. However unlike FIGS. 6 and 7 where the consumer is able to specify the at least one of plurality a peers the communiqué is being sent to, FIGS. 8 and 9 uses the at least one plurality of peers addressing information associated with a specific conversation or message. This is analogous to a "reply" or "reply all" function available in many messaging systems.

FIG. 26 is yet another alternative illustrative embodiment using words instead of graphical images to enable a consumer to specific the security attribute of a particular communiqué being generated. Given the previous scenarios of speech-to-text technology, enabling a non-graphical representation addresses a larger segment of the population or devices. One additional use case scenario may be on low-end systems, with limited graphical capability or input. Such systems may not have a touch screen or input navigational tools (mouse, etc) to select a check box or push a button. The security attribute may be specified in the form of a menu option or text in such cases.

Example UI Feature: New Message Notification

As communiqués are received, notification of its arrival may be paramount to the consumer. FIG. 21 represents a non-limiting illustrative embodiment of one such notification. The notifications can provide standard information about the communiqué such as who it's from, but now also includes the security attribute. FIG. 21 represents a textual indication of at least one secure message being received from the at least one of a plurality of peers. This textual indication may also enable the text-to-speech signaling for previously illustrated usage scenarios. Alternatively other non-limiting visual, auditory, or mechanical indications such as vibration, ring tone, verbal, iconic, or LED color and/or flashing rate can be employed. However in some situations, covert or otherwise, a consumer may opt to have any notifications turned off.

Example UI Feature: Peer Device Security Association Indication

Along with the security attribute of each message, a consumer needs the ability to easily differentiate the state of security associations among the at least one of plurality of peers it is in communications with. FIGS. 3 and 16 represent non-limiting illustrative embodiments of contact list. As part of the list of contacts, the graphical lock icon is displayed to indicate that a security association has been established with the at least one of a plurality of peers. In FIG. 3 for example, along with a peer's name and network identifier, in this case a phone number, a picture of the peer may also be include as part of the display. Other information may be viewable such as the date the contact was created or the security association was established. Again the lock icon may be replace with a textual representation for some usage scenarios.

Depending on the environment the interface is operating in, the elements in the contact list may be active components allowing the consumer to access additional information or actions. In one illustrative non-limiting embodiment, a consumer may select the picture, referred to as a badge or the entire contact element itself. FIG. 17 represents one non-limiting example of additional details that may be displayed when a particular contact is selected. FIG. 13 represents a non-limiting example options available to the consumer when selecting a particular contact.

FIG. 18 represents another non-limiting example of options potentially available when a consumer selects the badge instead of the entire contact. The consumer is presented a list of options including, but not limited to:
- Sending a message
- View more contact details
- Delete/modify contact information
- Resending a registration request to the at least one of the plurality of peers associated with the contact
- Place a voice call
- Other When instantiating a security association with at least one of a plurality of peers, providing for the ability to verify the exchange helps prevent attacks by malicious entities. To assist in this exchange, one illustrative non-limiting embodiment as depicted in FIG. 14 enables the consumer to input a passcode that can be used to verify the exchange.

Along with verifying the security associations, due to the potential secure nature of some of the communications, access to the actual display of messages, lists, contacts, etc. may be limited by design. As one example, FIG. 4 represents a non-limiting illustrative example of screen allowing a consumer to enter in a password before being granted access to a computer application used for message oriented communications. Other alternative input methods may also be used including, but not limited to biometrics, gestures on a touch screen, voice recognition, etc. that allow the identity of the consumer to be verify.

Example UI Feature: User Authentication

Providing for this verification may enable or use configuration of a computer application. FIGS. 4 and 24 depict non-limiting illustrative embodiments allowing a consumer to specify credentials that can be prompted for before access is granted to a computer messaging application. Depending on the application policy governing its input may also be enforced, including, but not limited to number of characters, upper/lower case letters, numbers, punctuation, expiry time, fingerprint, timeout before credentials are required to be reentered, etc.

Along with configuring credential information, other information may also be needed for operation of a computer application. FIG. 15 depicts a screen where additional account credential and status information can be input and/or reviewed. Through this screen, the consumer can view their potential account credentials, balances, cost, etc. In other non-limiting exemplary embodiments, additional configuration options may be input/modified/reviewed, including but not limited to screen timeout, message handling settings, notifications, registration or activation codes, etc.

It is to be appreciated that in other non-limiting illustrative embodiments, the options, details, security associations, security attributes, etc. may be accessed via voice prompting and voice recognition that allow for navigation of and input to a computer application.

It is to be appreciated that in other non-limiting embodiments, these options and details may be accessed programmatically as services to computer applications that allow for navigation and control of security for message oriented communications.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A user interface method for enabling a user to interact with a device having a processor, memory coupled to the processor and at least one input/output device coupled to the processor, the input/output device comprising at least a display and at least one mechanism that allows the user to input selections, the method comprising:
   - storing cryptographic material in the device;
   - receiving a message from a remote source;
   - determining, using the processor, whether received message content is secure or insecure;
   - in response to receipt of the message, displaying at least a portion of said received message content on said display if the determining determines the received message content is insecure;
   - if the determining alternatively determines the received message content is secure, not yet displaying at least a portion of said received message content on said display but instead displaying at least the title or other identifier of the message with and providing an indication indicating that the received message content is secure;
   - permitting a user to input whether to open the secure message;
   - upon receipt of user input commanding opening of the secure message, decrypting and displaying the secure message without requiring the user to input any cryptographic material but instead using the cryptographic material previously stored in the device;
   - wherein the processor arranges received messages into a conversation thread comprising both secure messages and insecure messages, and displays both secure messages and insecure messages in the same conversation thread in which secure messages are intermixed with insecure messages, the processor causing display of the indicator that indicates whether the received message content is secure before opening, decrypting and displaying received secure message content to said user.

2. The method of claim 1 wherein said indication comprises a visual display displayed on the display.

3. The method of claim 2 wherein the indication comprises a secure icon.

4. The method of claim 1 wherein the indication comprises displayed text displayed on the display.

5. The method of claim 1 wherein the indication comprises an audible signal.

6. The method of claim 1 wherein the indication is associated with the processor automatically enabling or disabling additional functionality associated with processing the indicated message.

7. The method of claim 1 wherein the secured messages are secured at least in part with Public Key cryptography.

8. A user system for receiving messages from at least one network and processing said messages for presentation to a user, the system comprising:
   - a processor;
   - a presentation device operatively coupled to the processor;
   - a communications adapter operatively coupled to the processor, the communications adapter in use receiving messages from at least one network;
   - a non-transitory memory device operatively coupled to the processor, said memory device storing (a) cryptographic material and (b) instructions that the processor executes to present, on the presentation device operatively coupled to the processor, a notification that a message has been received by the device, the notification enabling the user to ascertain whether the received message is secure or not before opening and reading the message, the stored instructions further comprising instructions permitting a user to input whether to open the secure message and upon receipt of user input commanding opening of the secure message, decrypting and displaying the secure message without requiring the user to input any cryptographic material but instead using the cryptographic material stored in the memory device, the processor arranging received messages into a common conversation thread comprising both secure and insecure messages, the device arranging display of the secure and insecure messages in the common conversation thread so that secure messages are intermixed with insecure messages.

9. The stem of claim 8 wherein said notification comprises a visual notification and the presentation device comprises at least one display.

10. The system of claim 8 wherein the notification comprises an audible notification and the presentation device comprises at least one audio transducer.

11. The system of claim 8 wherein the notification comprises a tactile notification and the presentation device comprises at least one transducer that generates tactile sensations.

12. The system of claim 8 wherein the notification comprises a secure icon.

13. The stem of claim 8 wherein the notification comprises displayed text.

* * * * *